US009028017B2

(12) United States Patent  (10) Patent No.: US 9,028,017 B2
Nicholson  (45) Date of Patent:  May 12, 2015

(54) PRESSURE MOUNTED DRAWER APPARATUS

(71) Applicant: Jeffrey M Nicholson, Franklin, MA (US)

(72) Inventor: Jeffrey M Nicholson, Franklin, MA (US)

(*) Notice: Subject to any disclaimer, the term of this patent is extended or adjusted under 35 U.S.C. 154(b) by 0 days.

(21) Appl. No.: 13/661,085

(22) Filed: Oct. 26, 2012

(65) Prior Publication Data

US 2013/0113352 A1  May 9, 2013

Related U.S. Application Data

(60) Provisional application No. 61/555,074, filed on Nov. 3, 2011.

(51) Int. Cl.

| A47B 95/00 | (2006.01) |
|---|---|
| A47B 88/00 | (2006.01) |
| E05B 65/00 | (2006.01) |
| A47B 47/00 | (2006.01) |
| E05B 65/46 | (2006.01) |
| F16B 12/26 | (2006.01) |
| F16B 12/38 | (2006.01) |
| A47B 57/06 | (2006.01) |

(52) U.S. Cl.
CPC .............. *E05B 65/0014* (2013.01); *A47B 57/06* (2013.01); *A47B 47/0066* (2013.01); *E05B 65/46* (2013.01); *F16B 12/26* (2013.01); *F16B 12/38* (2013.01)

(58) Field of Classification Search
CPC .... A47B 96/02; A47B 96/022; A47B 96/024; A47B 96/025; A47B 96/066; A47B 57/06; A47B 96/14

USPC .............. 312/351, 330.1, 304; 108/42, 153.1, 108/101, 180; 248/585, 591, 592, 631
See application file for complete search history.

(56) References Cited

U.S. PATENT DOCUMENTS

| 1,286,588 | A | * | 12/1918 | Goodykoontz | ................. 108/28 |
| 1,763,034 | A | * | 6/1930 | Bunker | ........................ 211/123 |
| 1,836,126 | A | * | 12/1931 | Luce | ............................... 108/42 |
| 2,420,173 | A | * | 5/1947 | Hall | ............................... 211/153 |
| 4,366,774 | A | * | 1/1983 | Haake et al. | ................... 119/452 |
| 4,749,164 | A | * | 6/1988 | Leo et al. | ...................... 248/674 |
| 5,016,946 | A | * | 5/1991 | Reznikov et al. | ............. 312/108 |
| 5,405,194 | A | * | 4/1995 | Binder | .......................... 312/205 |
| 5,992,654 | A | * | 11/1999 | Dente, Jr. | .................... 211/90.01 |
| 6,059,128 | A | * | 5/2000 | Wang | .......................... 211/90.01 |
| 6,257,151 | B1 | * | 7/2001 | Hale | ............................... 108/42 |
| 6,655,538 | B2 | * | 12/2003 | Saulnier-Matteini | ......... 211/153 |
| 6,659,576 | B1 | * | 12/2003 | Welch | ....................... 312/334.41 |
| 2005/0248248 | A1 | * | 11/2005 | Moss | ............................ 312/351 |
| 2005/0269921 | A1 | * | 12/2005 | Remmers | ................... 312/330.1 |
| 2006/0192469 | A1 | * | 8/2006 | Koo | ............................ 312/330.1 |

FOREIGN PATENT DOCUMENTS

| JP | 10327957 A | * | 12/1998 | ............. A47B 96/14 |
| WO | WO 2010058392 A1 | * | 5/2010 | ............. A47B 96/02 |

* cited by examiner

*Primary Examiner* — Janet M Wilkens
*Assistant Examiner* — Andrew Roersma
(74) *Attorney, Agent, or Firm* — Todd L. Juneau

(57) ABSTRACT

Systems, methods and apparatus are provided through which in some implementations an expandable or adjustable snap-in cam or other friction device having a mechanically lockable drawer, shelf or divider in a cabinet, pantry, kitchen cupboard mount includes no screws or other permanent mounting.

9 Claims, 22 Drawing Sheets

FIG. 8 — UNLOCKED CONFIGURATION

FIG. 9 — LOCKED CONFIGURATION

PRESSURE MOUNTED DRAWER APPARATUS

RELATED APPLICATION

This application claims the benefit of U.S. Provisional Application Ser. No. 61/555,074 filed 3 Nov. 2011 under 35 U.S.C. 119(e).

FIELD

The field of the invention is a pressure mounted storage system with a locking friction clamp and a sliding container.

BRIEF DESCRIPTION

A pressure mounted storage system (PMSS) is a kitchen space optimization solution that reclaims unused storage space, reduces clutter, and delivers high-end functionality—without tools—at fraction of the price of existing systems. The PMSS is particularly beneficial in households that desire more kitchen storage space and improved organization, in contrast to professional kitchen remodeling which is expensive, and do-it-yourself (DIY) home improvement kits which are messy, time-consuming and require specific expertise, without nailing, screwing, drilling or expensive contractors—making kitchen upgrading a snap. The pressure mounting provides a friction mounting or a friction and pressure mounting of a storage apparatus to the inside of an existing kitchen cabinet or other enclosure. The drawer is one example of a shelf or other form of storage.

In one aspect, a pressure mounting apparatus comprises a platform and a locking friction clamp having at least two snap arms that are pivotally coupled at first ends to each other through a push/pivot buckle and each of the at least two snap arms being pivotally attached at second ends to a snap compression pad, wherein the plurality of snap arms have a locked position and an unlocked position wherein the locking friction clamp being mounted on the platform.

In a further aspect, an enclosure comprises a plurality of walls comprising an exterior of the enclosure, the plurality of walls forming an interior of the enclosure, a platform attached to the interior of the walls and having faces comprising a side, a front and a rear, and a plurality of locking bars protruding from at least one of the faces of the platform, wherein the plurality of locking bars have a locked position and an unlocked position wherein the plurality of locking bars being pivotally mounted on the platform, and wherein the locking bars create friction in the locked position against the plurality walls to hold the platform in place.

In another aspect, an enclosure comprises a platform, a plurality of walls coupled to the platform and at least one pivoting lever member that is mounted on the platform and operable to pivot into a position that creates force and friction against the walls.

Pressure mounting apparatuses of varying scope are described herein. In addition to the aspects and advantages described in this summary, further aspects and advantages will become apparent by reference to the drawings and by reading the detailed description that follows.

DETAILED DESCRIPTION

In the following detailed description, reference is made to the accompanying drawings that form a part hereof, and in which is shown by way of illustration specific implementations that may be practiced. These implementations are described in sufficient detail to enable those skilled in the art to practice the implementations, and it is to be understood that other implementations may be utilized and that logical, mechanical, electrical and other changes may be made without departing from the scope of the implementations. The following detailed description is, therefore, not to be taken in a limiting sense.

The detailed description is divided into three sections. In the first section, apparatus described. In the second section, a method is described. In the third section, a conclusion of the detailed description is provided.

Apparatus

Figure 1:
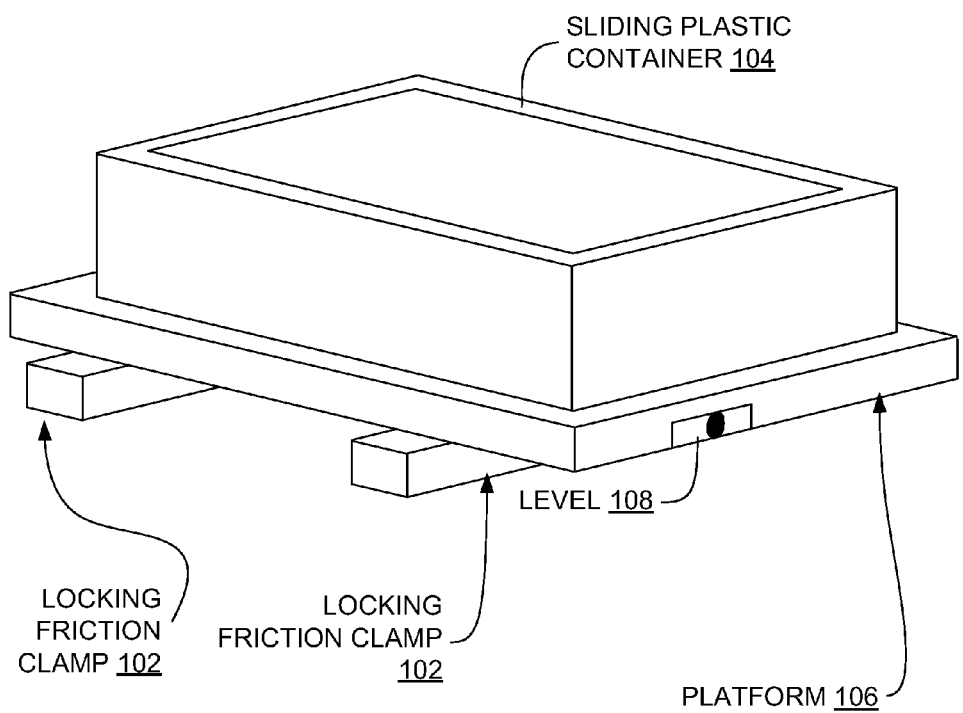
FIG. 1 is an isometric diagram of a pressure mounted storage apparatus, according to an implementation.

FIG. 1 is an isometric diagram of a pressure mounted storage apparatus 100, according to an implementation. Apparatus 100 includes two notable features and attributes: a locking friction clamp 102 and a sliding container 104. The sliding container 104 is moveably mounted or moveably attached to the locking friction clamp 102 through a platform 106. In the example shown in FIG. 1-9 the sliding plastic container 104 is a sliding drawer, but in other examples shown in FIG. 14-13, the sliding plastic container 104 is a lockable "child-proof" lockable drawer, a spice drawer, a crisper drawer, or a wrap drawer. In some implementations of the sliding drawer shown in FIG. 1, the sliding drawer is collapsible container. Some implementations of the pressure mounted storage system include a level 108 that is integrated into the apparatus that can be used during installation to determine if the pressure mounted storage system is positioned level along an axis.

One particular benefit of pressure mounted storage apparatus 100 is that the pressure mounted storage apparatus 100 is not attached to the inside of a cabinet enclosure with screws, nails, tape, adhesive, or any other common attachment device. Instead, the pressure mounted storage apparatus 100 is simply "snapped" into place using an integrated clamp system of the locking friction clamp 102 (shown in FIG. 1-9). The integrated clamp system places outward pressure against opposing inside wall(s) of the cabinet, securely holding pressure mounted storage apparatus 100 in place within and inside the cabinet.

All cabinets in North America have standard sizes. Standard base kitchen cabinet sizes uniform in terms of depth and height (24" deep, 34½" tall). The widths are also predictable and standardized, with stock cabinets available in 3" increments (9", 12", 15", etc., usually up to 36"). The dimension makes ordering the right size no different than specifying a preferred size of shirt. Thus, the pressure mounted storage apparatus 100 is also manufactured in predictable and standardized dimensions, well-suited for mass production.

In some implementations, the sliding plastic container 104 includes an integrated pull stop (not shown in FIG. 1) so that the sliding plastic container 104 may not be completely pulled out of its housing (not shown in FIG. 1).

Figure 1B:
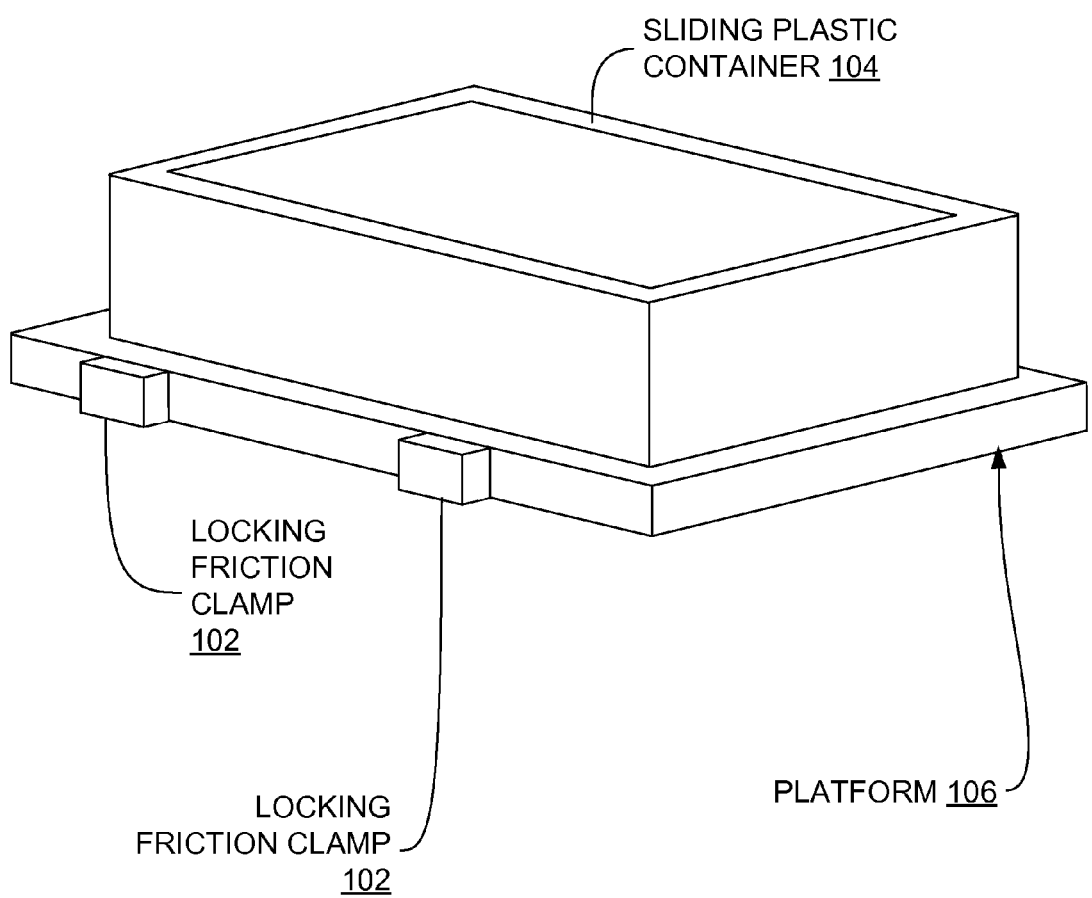
FIG. 1B is an isometric diagram of a locking friction clamp integrated into a platform of a pressure mounted storage apparatus, according to an implementation.

FIG. 1B is an isometric diagram of a locking friction clamp integrated into a platform of a pressure mounted storage apparatus 150, according to an implementation; Apparatus 150 includes two notable features and attributes: the locking friction clamp 102 is integrated into the platform 106 and the sliding container 104. The sliding container 104 is slideably mounted or slideably attached to the locking friction clamp 102 through the platform 106.

Figure 2:
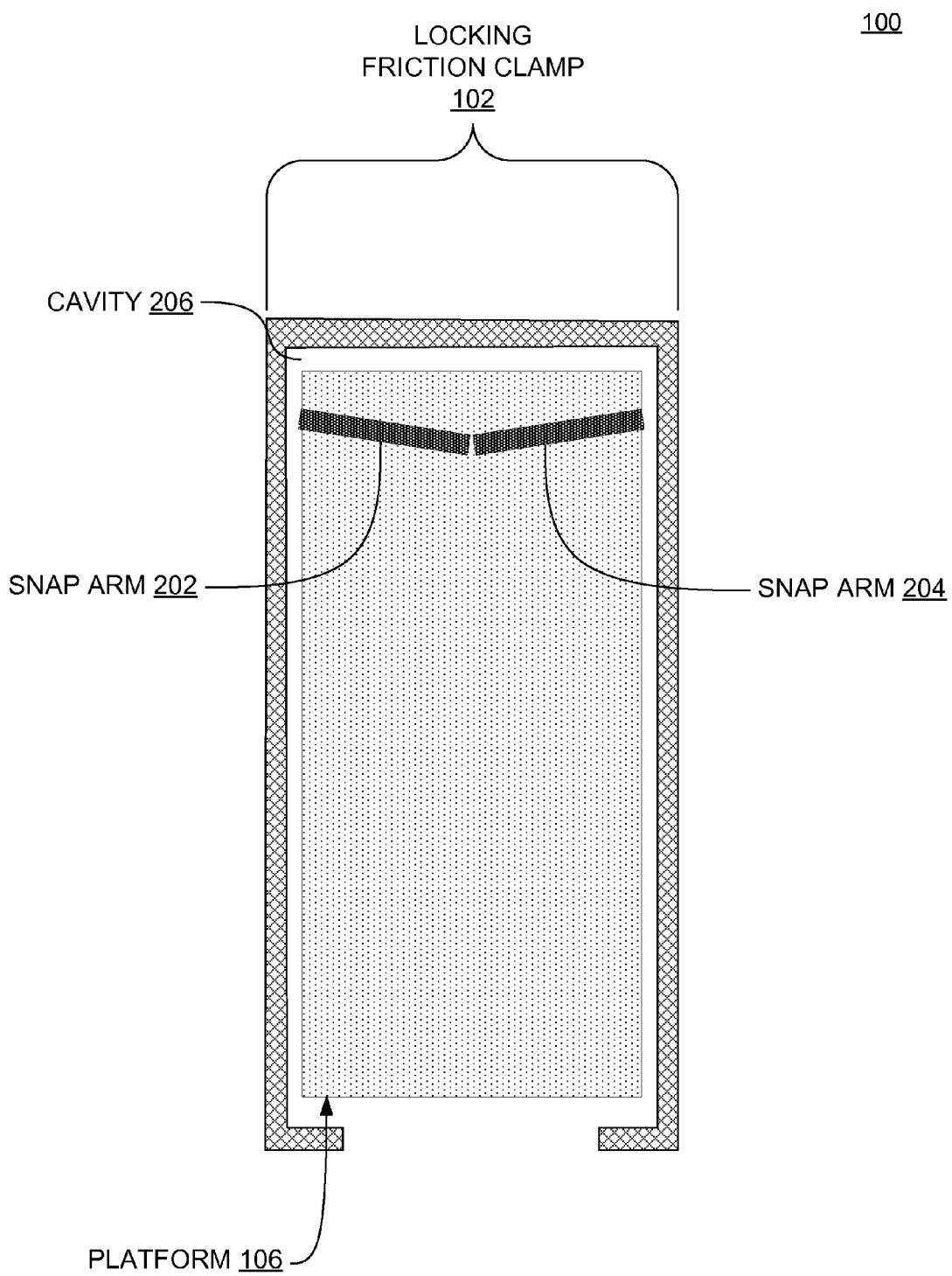
FIG. 2 is a bottom view of a block diagram of a pressure mounted apparatus 100 of a pressure mounted storage system in an unlocked configuration, according to an implementation.
Figure 3:
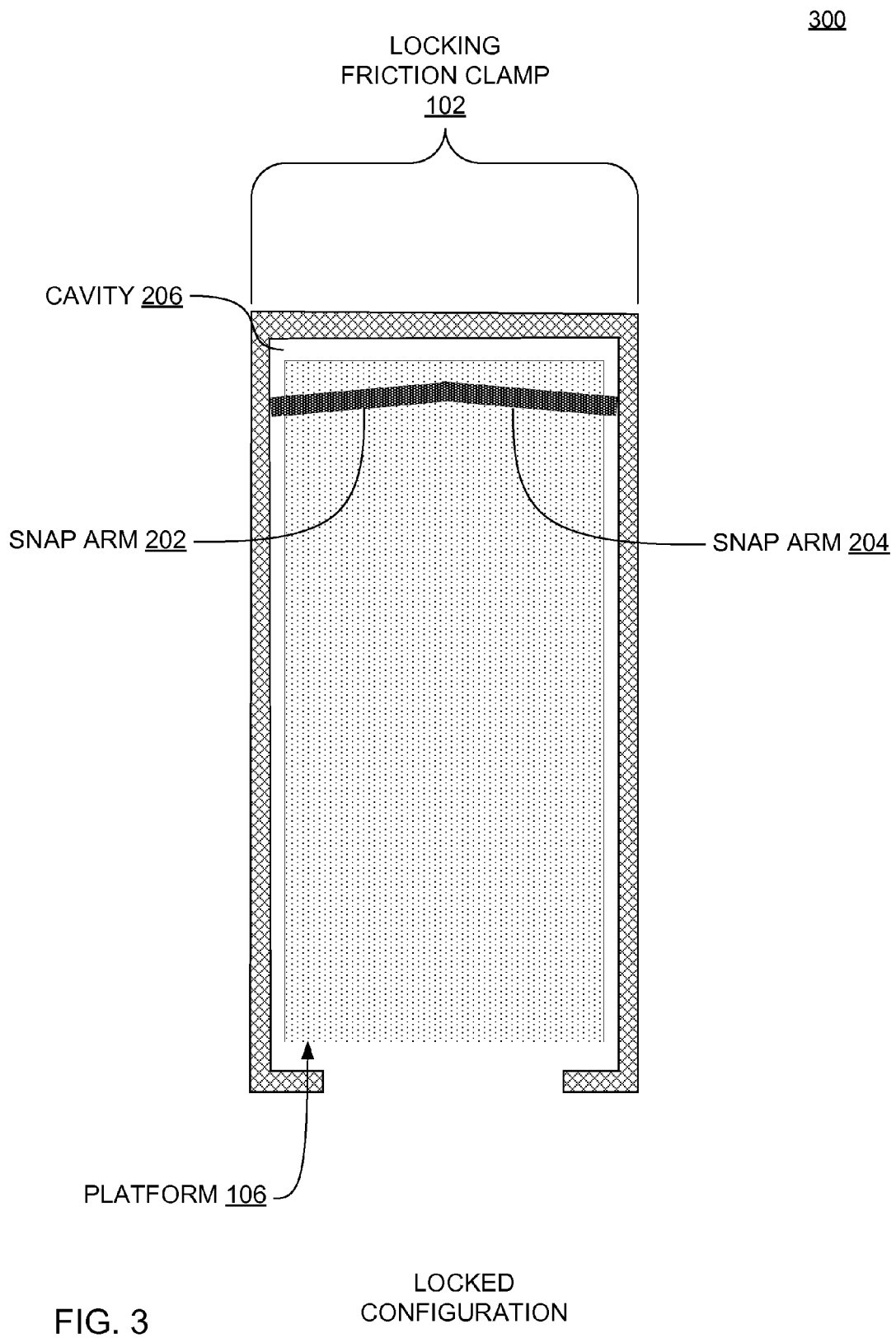
FIG. 3 is a bottom view of a block diagram of a pressure mounted apparatus of a pressure mounted storage system in a locked configuration, according to an implementation.
Figure 4:
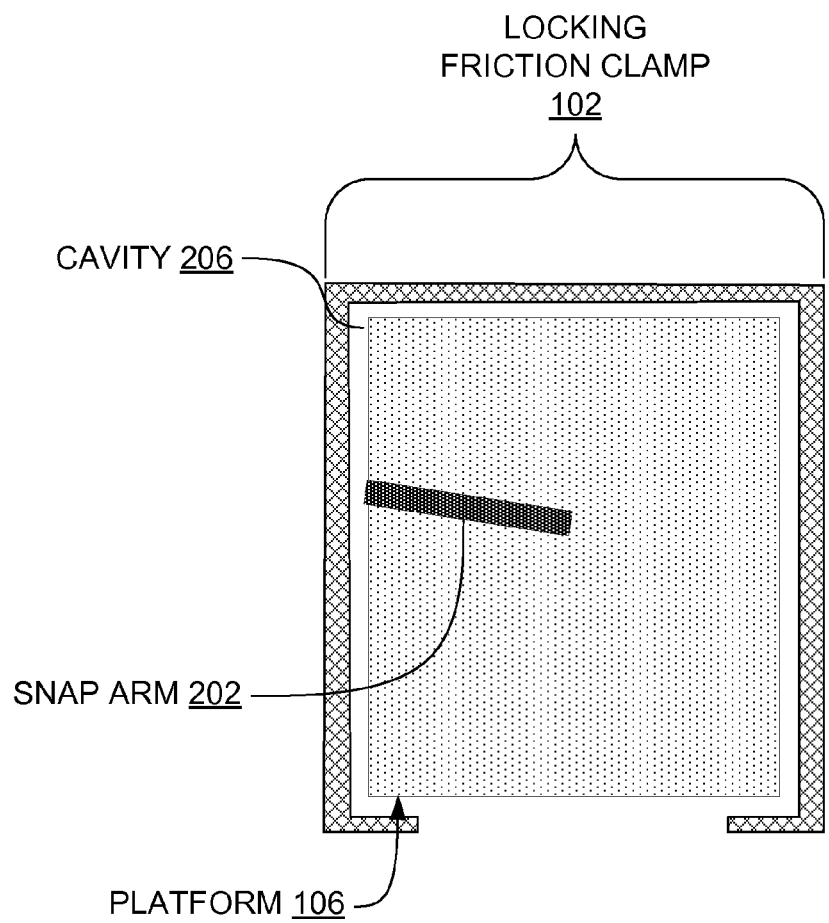
FIG. 4 is a bottom view of a block diagram of a pressure mounted apparatus of a pressure mounted storage system in an unlocked configuration, according to an implementation.
Figure 5:
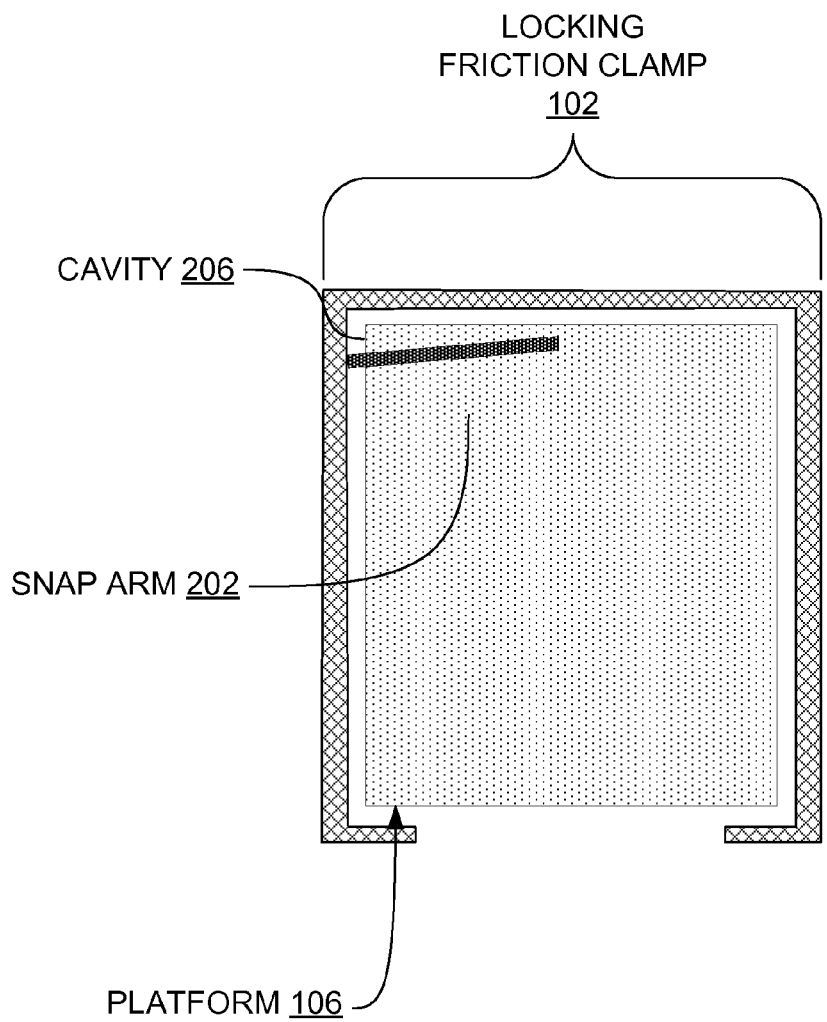
FIG. 5 is a bottom view of a block diagram of a pressure mounted apparatus of a pressure mounted storage system in an unlocked configuration, according to an implementation.

FIG. 2 is a bottom view of a block diagram of a pressure mounted apparatus 100 of a pressure mounted storage system in an unlocked configuration, according to an implementation. The pressure mounted apparatus 100 includes a platform 106 and a locking friction clamp 102. The locking friction clamp 102 includes at least one snap arm 202 that is pivotally coupled to at least one of the platform 106 (as shown in FIG. 4-5 and at least one other snap arm 204. The at least one snap arm 202 has an unlocked (and an unlocked position as shown in FIG. 3). The at least one snap arm 202 is operable to hold the platform 106 in position in a cavity 206 by creating friction against at least on side of the cavity in the locked position, as shown in FIG. 3. In some implementations of the snap arm, the snap arm is extendable or adjustable in reach. In one example of the extendable or adjustable snap arm, the snap arm 202 is adjustable through screws, where some portion of the snap arm 202 is threaded onto a base of the snap arm 202 or onto a lead screw and threading out the screw makes the snap arm 202 longer. In another example of the extendable or adjustable snap arm, the snap arm 202 is adjustable through discrete position adjustment, wherein the snap arms 202 are snapped into different positions using a spring loaded ball or pin and holes in a sliding outer member.

In some implementations, the platform 106 is adjustable or extendable in width, such as by a sleeve that is a part of platform 106, and by a center piece that fits inside the sleeve and slides out to extend the width of the platform 106. In some implementations, the adjustable or extendable platform 106 does not lock into a given width because the platform 106 takes only vertical loads. The locking friction clamp 102 is attached to the bottom of the adjustable or/extendable platform 106 and the snap arm(s) 202 are adjustable in length, but the locking friction clamp 102 is fixed in width and has a width that is not adjustable or extendable.

FIG. 3 is a bottom view of a block diagram of a pressure mounted apparatus 100 of a pressure mounted storage system in a locked configuration, according to an implementation. The at least one snap arm 202 is in a locked position as shown in FIG. 3. The at least one snap arm 202 holds the platform 106 in a position in a cavity 206 by creating friction against at least on side of the cavity in the locked position FIG. 4 is a bottom view of a block diagram of a pressure mounted apparatus 100 of a pressure mounted storage system in an unlocked configuration, according to an implementation. The pressure mounted apparatus 100 includes a platform 106 and a locking friction clamp 102. The locking friction clamp 102 includes at least one snap arm 202 that is pivotally coupled to at least one of the platform 106 (as shown in FIG. 4-5. The at least one snap arm 202 has an unlocked (and an unlocked position as shown in FIG. 5). The at least one snap arm 202 is operable to hold the platform 106 in position in a cavity 206 by creating friction against at least one side of the cavity in the locked position, as shown in FIG. 5.

FIG. 5 is a bottom view of a block diagram of a pressure mounted apparatus 100 of a pressure mounted storage system in a locked configuration, according to an implementation. The pressure mounted apparatus 100 includes a platform 106 and a locking friction clamp 102. The locking friction clamp 102 includes at least one snap arm 202 that is pivotally coupled to at least one of the platform 106. The at least one snap arm 202 is a locked position as shown in FIG. 5. The at least one snap arm 202 is operable to hold the platform 106 in position in a cavity 206 by creating friction against at least one side of the cavity in the locked position.

Figure 6:
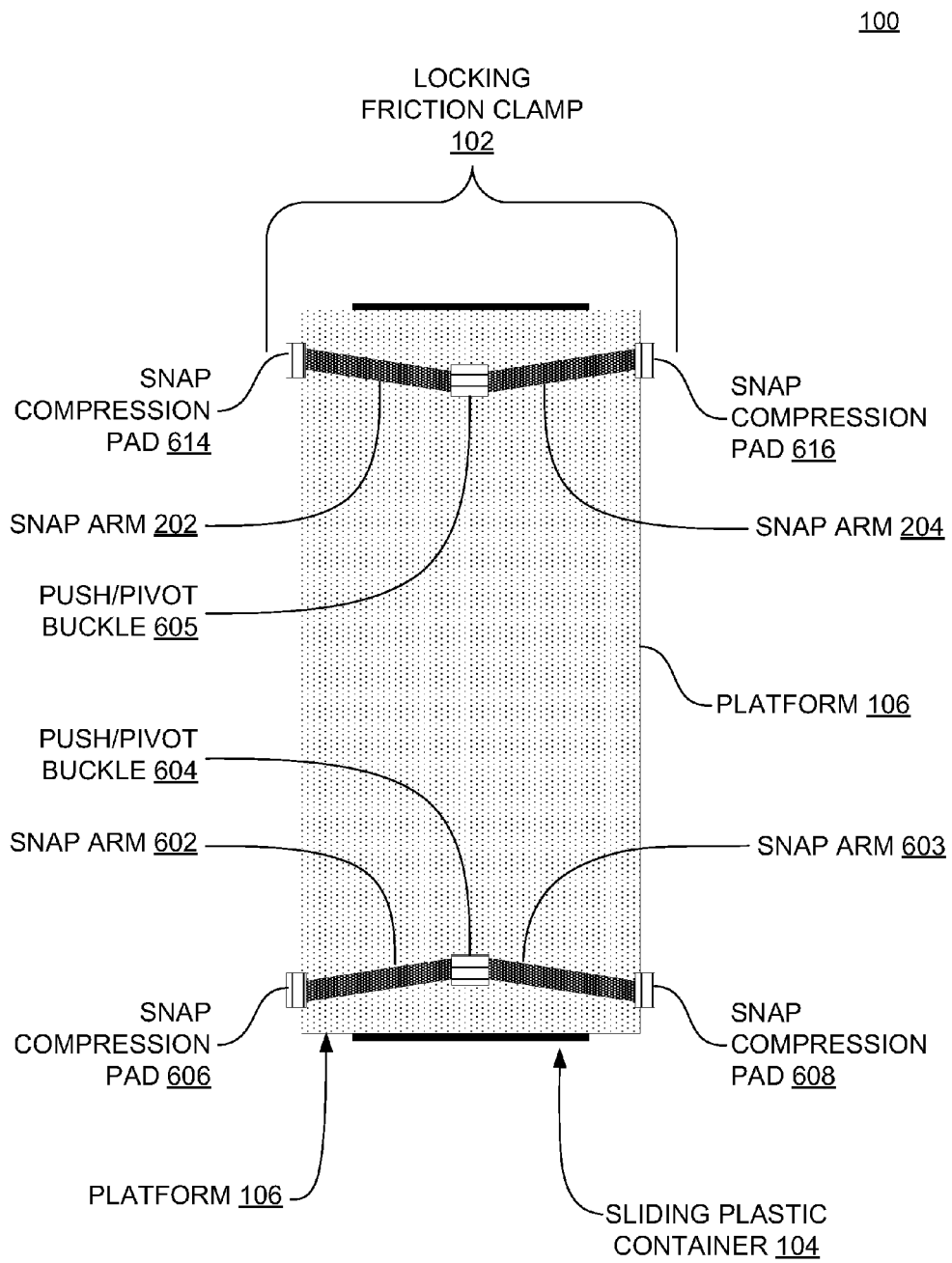
FIG. 6 is a bottom view of a block diagram of a pressure mounted storage apparatus of a pressure mounted storage system in an unlocked configuration, according to an implementation.

FIG. 6 is a bottom view of a block diagram of a pressure mounted storage apparatus 100 of a pressure mounted storage system in an unlocked configuration, according to an implementation. The pressure mounted storage apparatus 100 is shown in FIG. 6 in an unlocked configuration.

Each locking friction clamp 102 includes at least 2 snap arms (such as 202 and 204; or 602 and 603) that are rigid arms. When the snap arms are pushed outward by a push/pivot buckle 605 and 604, the snap arms apply pressure through snap compression pads 614, 616, 606 and 608 upon and onto the inner walls of the cabinet enclosure 814. Each pair of snap arms (such as pair 202 and 204) are identical in structure and function. The push/pivot buckles 605 and 604 rotatably connect the snap arms together and serve as the central connection and rotation point to the snap arms. The snap compression pads 614, 616, 606 and 608 are attached at the end of each snap arm to ensure snug and lasting fit.

Unlike conventional approaches which require tools and precision measurement, the pressure mounted storage apparatus 100 takes advantage of the rigidity and predictability of the size and space of standard kitchen cabinets in which the dimensions of the pressure mounted storage apparatus 100 is reasonably calculated to have a tight snug fit in a specifically sized cabinet when the snaps arms 202, 204, 602 and 603 are locked (such as in FIG. 7) yet the pressure mounted storage apparatus 100 is reasonably calculated to have a loose fit in the same specifically sized cabinet when the snaps arms 202, 204, 602 and 603 are unlocked (such as in FIG. 6).

The snap arms (e.g. 202, 204, 602 and 603) are also known as pivoting lever members.

The snap arms (e.g. 202, 204, 602 and 604) are also known as pivoting lever members. The snap compression pad (e.g. 614) is also known at a locking bar.

Figure 7:
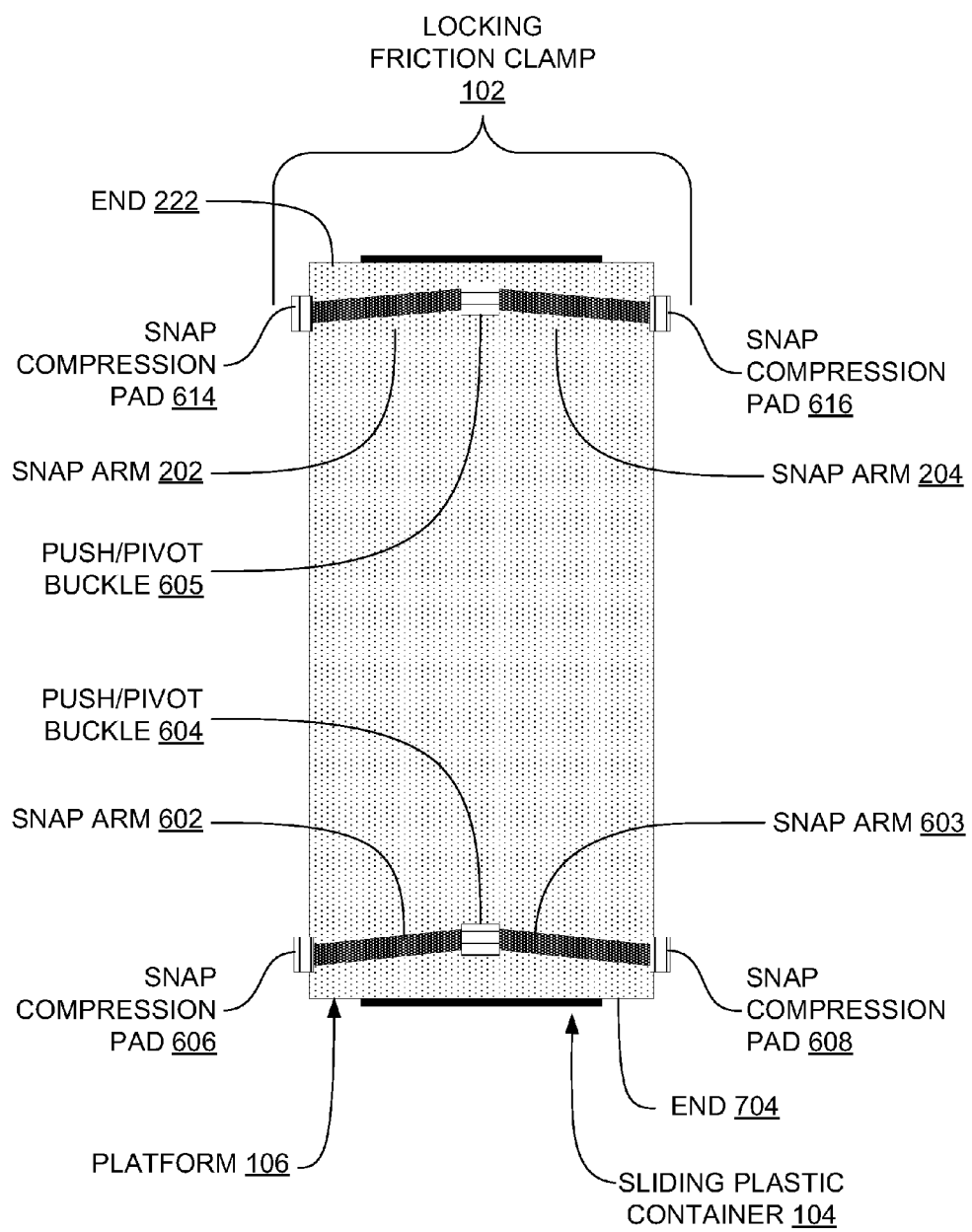
FIG. 7 is a bottom view of a block diagram of a pressure mounted storage apparatus of a pressure mounted storage system in a locked configuration, according to an implementation.

FIG. 7 is a bottom view of a block diagram of a pressure mounted storage apparatus 100 of a pressure mounted storage system in a locked configuration, according to an implementation. The pressure mounted storage apparatus 100 shown in FIG. 7 is a locked configuration.

The locking friction clamp 102 includes snap arms 202, 204, 602 and 603 that are rigid arms that when pushed outward by the push/pivot buckle 605 and 604, as shown in FIG. 7, applies pressure through snap compression pads 614, 616, 606 and 608 upon the outer walls of the cabinet enclosure 814. The snap compression pads 614, 616, 606 and 608 is attached at the end of each snap arm to ensure snug and lasting fit. Note that in the locked configuration or position as shown in FIG. 7, the snap arms 202, 204, 602 and 603 are not aligned in a straight line to each other, but have in fact been moved from the position as shown in FIG. 6 to a position further beyond straight alignment to each other to a position in which the push/pivot buckle 605 is closer to closest end 222 of the platform 106 than are the snap compression pads 614 and 616 and to a position in which the push/pivot buckle 604 is closer to closest end 702 of the platform 106 than are the snap compression pads 606 and 608. The location of the snap arms 202, 204, 602 and 603 when not aligned in a straight line to each other after having been moved from the position as shown in FIG. 6 to a position further beyond straight alignment to each other is known as "negative space" helps ensure position of the locking friction clamp 102 remains locked in place, without risk of unintentional release. The negative space is an area on one side of the snaps arms 202, 204, 602 and 603 in which the snap arms move past 90 degrees into a locked position of about 3 degrees past 90 or so.

Figure 8:
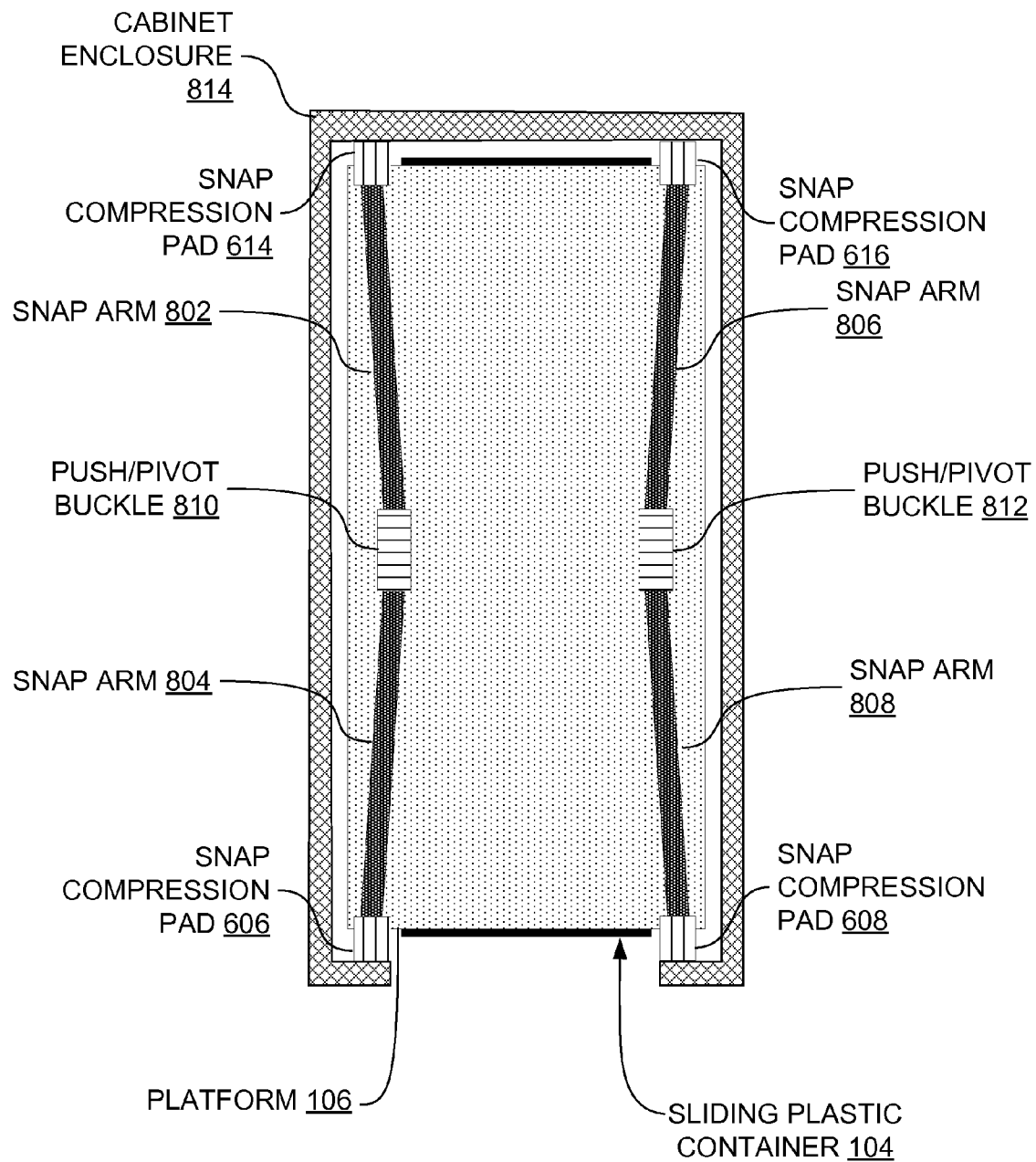
FIG. 8 is a bottom view of a block diagram of a lateral pressure mounted storage apparatus of a pressure mounted storage system in an unlocked configuration, according to an implementation.

The snap arms can be positioned either from side-to-side as shown in FIG. 6-3 or from front-to-back as shown in FIG. 8-5. In another example of the extendable or adjustable snap arm, each snap arm is adjustable through caps or compression pads 606, 608, 614 and 616 of different thicknesses can be placed on the ends of the snap arms, 202, 204, 602 and 603, respectively. In some implementations, the snap arms (e.g. 202, 204, 602 and 603) have a threaded end that allows adjustment of the length of the snap arms.

FIG. 8 is a bottom view of a block diagram of a lateral pressure mounted storage apparatus 800 of a pressure mounted storage system in an unlocked configuration, according to an implementation. The pressure mounted storage apparatus 800 is shown in FIG. 8 in an unlocked configuration.

The locking friction clamp 102 includes snap arms 802, 804, 806 and 808 that are rigid arms. When the snap arms are pushed outward by a push/pivot buckle 810 and 812, the snap arms apply pressure through snap compression pads 614, 616, 606 and 608 upon and onto the inner walls of the cabinet enclosure 814. Each pair of snap arms (such as pair 802 and 804) are identical in structure and function. The push/pivot buckles 810 and 812 connect the snap arms together and serve as the central connection and rotation point to the snap arms. The snap compression pads 614, 616, 606 and 608 are attached at the end of each snap arm to ensure snug and lasting fit. Negative space ensures position of the locking friction clamp 102 remains locked in place, without risk of unintentional release.

Figure 9:
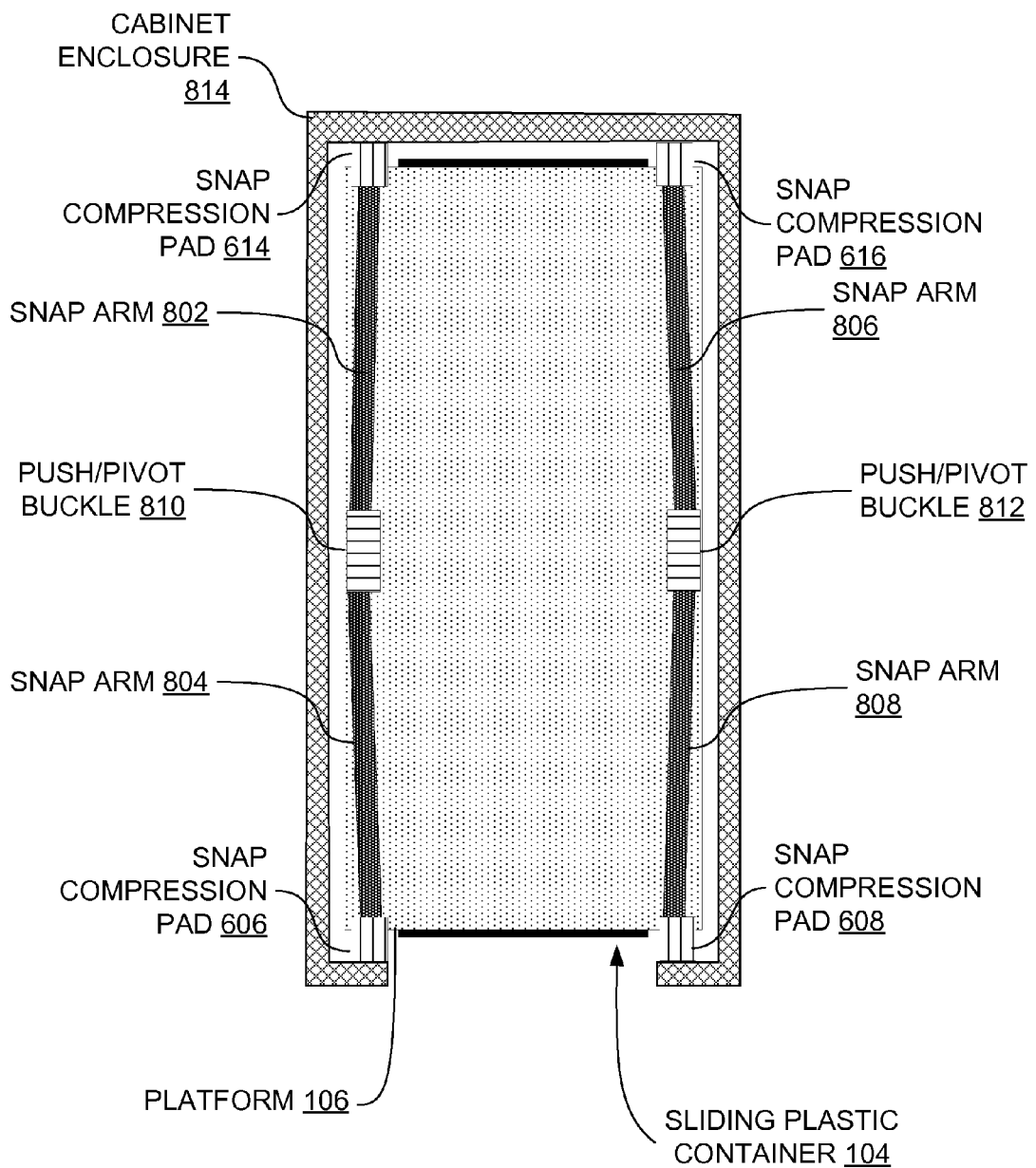
FIG. 9 is a bottom view of a block diagram of a lateral pressure mounted storage apparatus of a pressure mounted storage system in a locked configuration, according to an implementation.

FIG. 9 is a bottom view of a block diagram of a lateral pressure mounted storage apparatus 800 of a pressure mounted storage system in a locked configuration, according to an implementation. The pressure mounted storage apparatus 800 shown in FIG. 9 in a locked configuration.

The locking friction clamp 102 includes snap arms 802, 804, 806 and 808 that are rigid arms that when pushed outward by the push/pivot buckle 810 and 812, as shown in FIG. 9, applies pressure through the snap compression pads 614, 616, 606 and 608 upon the outer walls of the cabinet enclosure 814. The snap compression pads 614, 616, 606 and 608 is attached at the end of each snap arm to ensure snug and lasting fit. Negative space ensures position of the locking friction clamp 102 remains locked in place, without risk of unintentional release.

Figure 10:
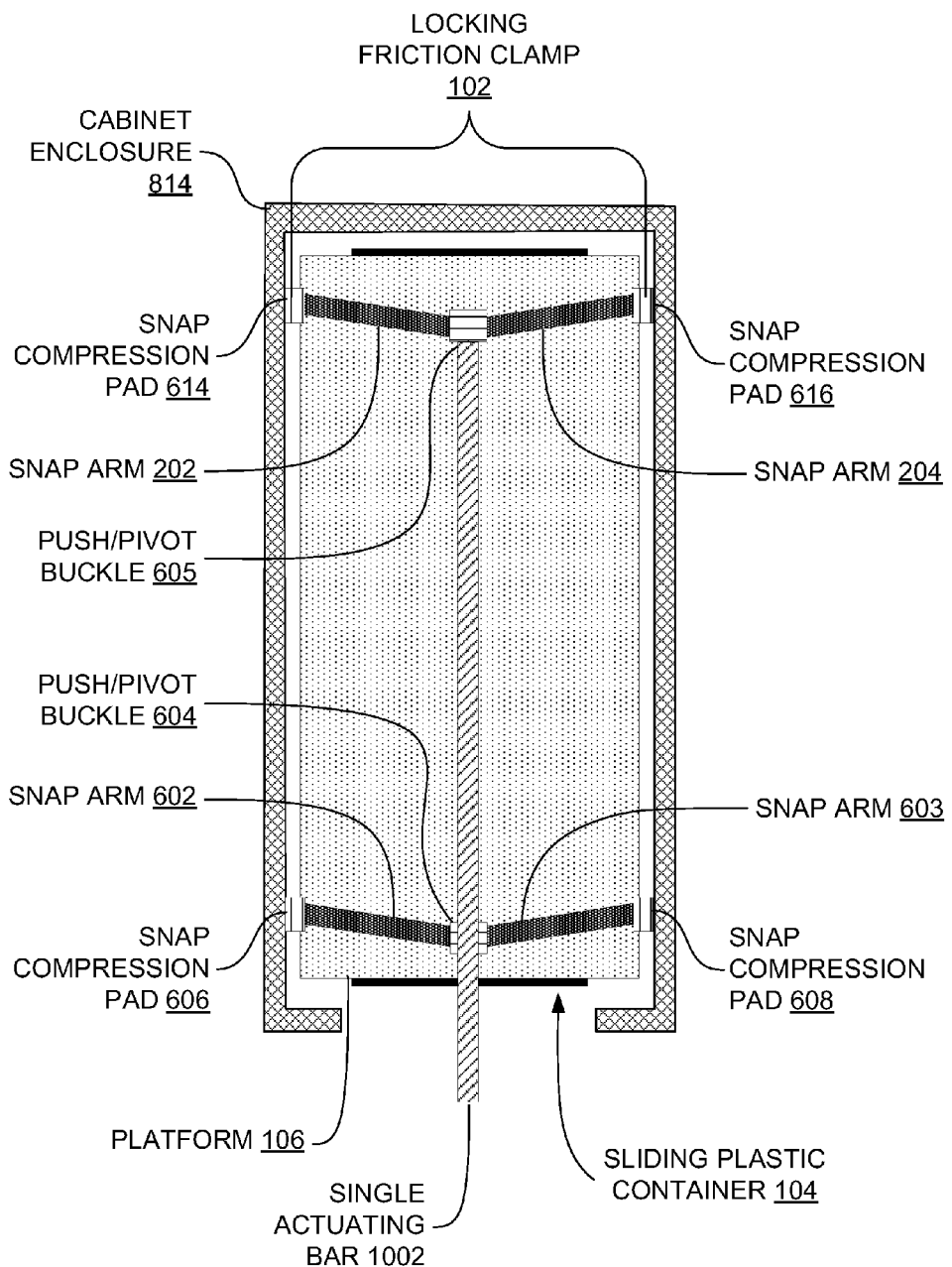
FIG. 10 is a bottom view of a block diagram of a pressure mounted storage apparatus of a pressure mounted storage system having a single actuating bar in an unlocked configuration, according to an implementation.

FIG. 10 is a bottom view of a block diagram of a pressure mounted storage apparatus 1000 of a pressure mounted storage system having a single actuating bar in an unlocked configuration, according to an implementation. The pressure mounted storage apparatus 100 is shown in FIG. 6 in an unlocked configuration.

The single actuating bar 1002 provides a mechanism to apply mechanical pressure to all of the snap arms 202, 204, 602 and 603 simultaneously.

Figure 11:
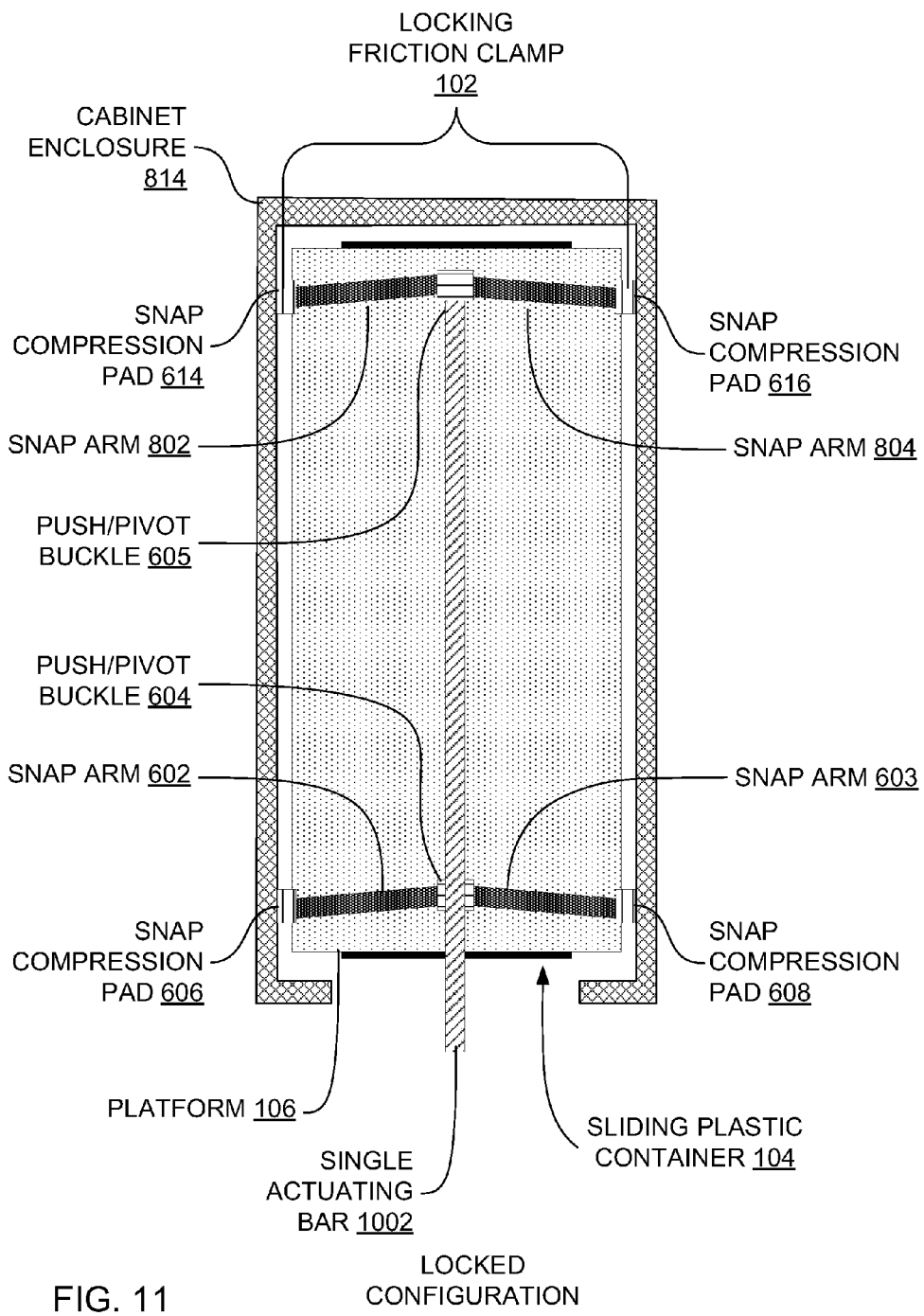
FIG. 11 is a bottom view of a block diagram of a pressure mounted storage apparatus of a pressure mounted storage system having a single actuating bar in a locked configuration, according to an implementation.

FIG. 11 is a bottom view of a block diagram of a pressure mounted storage apparatus 1100 of a pressure mounted storage system having a single actuating bar in a locked configuration, according to an implementation. The pressure mounted storage apparatus 100 is shown in FIG. 11 in a locked configuration.

The single actuating bar 1002 applies mechanical pressure to all of the snap arms 202, 204, 602 and 603 simultaneously. In another implementation of pressure mounted storage apparatus 1000 in FIG. 10 and pressure mounted storage apparatus 1100 in FIG. 1100, at least two actuating bars are implemented, one actuating bar positioned towards the left side of the pressure mounted storage apparatus 1000 and 1100 and a second actuating bar positioned towards the right side of the pressure mounted storage apparatus 1000 and 1100.

Figure 12:
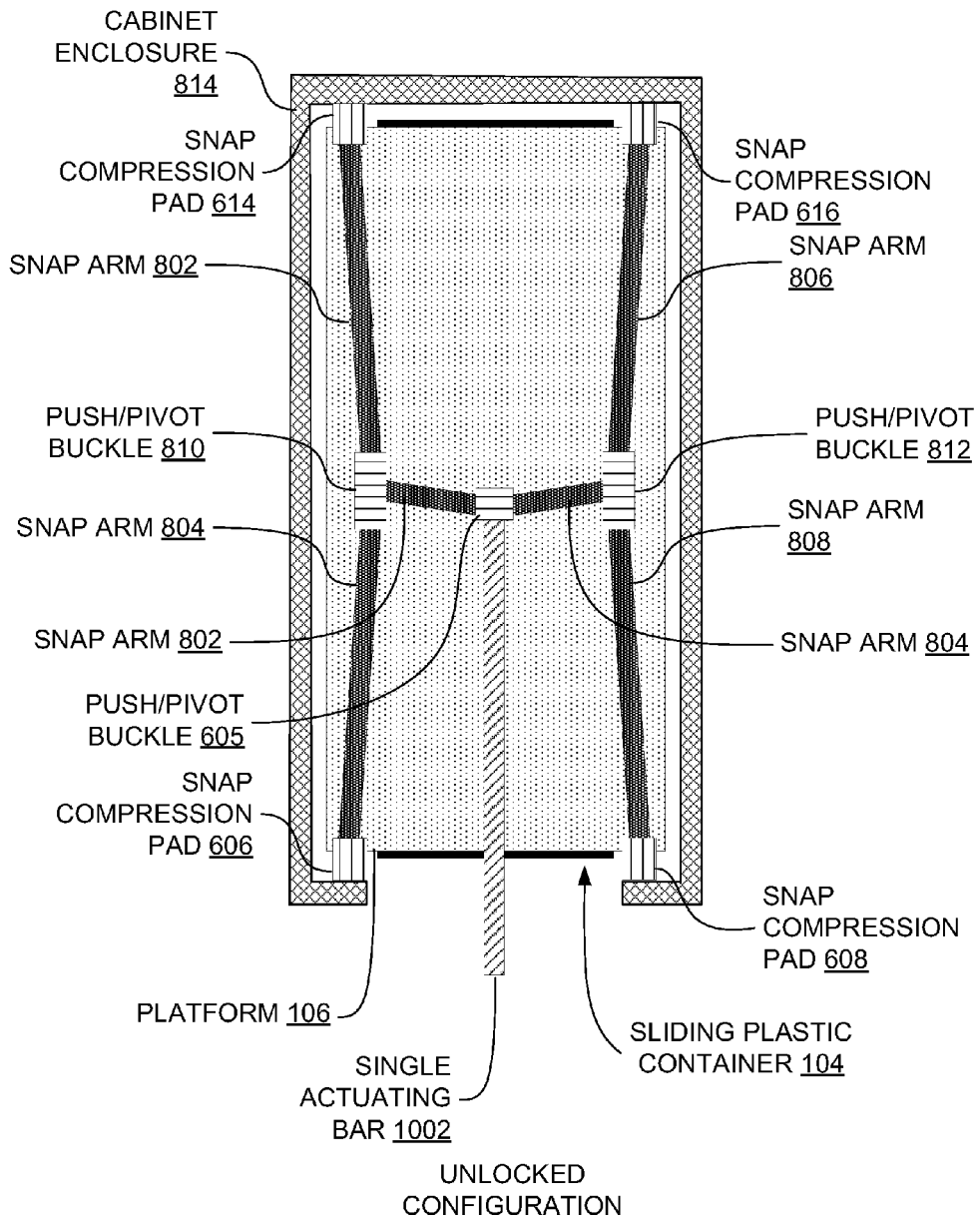
FIG. 12 is a bottom view of a block diagram of a lateral pressure mounted storage apparatus of a pressure mounted storage system in an unlocked configuration, according to an implementation.

FIG. 12 is a bottom view of a block diagram of a lateral pressure mounted storage apparatus 1200 of a pressure mounted storage system in an unlocked configuration, according to an implementation. The pressure mounted storage apparatus 1200 is shown in FIG. 12 in an unlocked configuration.

The locking friction clamp 102 includes snap arms 202 and 204 that are rigid arms. When the snap arms 802 and 804 are pushed outward by a push/pivot buckle 810, the snap arms 802 and 804 apply pressure through snap compression pads 614, 616, 606 and 608 upon and onto snap arms 802, 804, 806 and 808 that are rigid arms. When the snap arms are pushed outward by a push/pivot buckle 810 and 812, the snap arms apply pressure through a snap compression pads 614, 616, 606 and 608 upon and onto the inner walls of the cabinet enclosure 814. Each pair of snap arms (such as pair 802 and 804) are identical in structure and function. The push/pivot buckles 810 and 812 connect the snap arms together and serve as the central connection and rotation point to the snap arms. The snap compression pads 614, 616, 606 and 608 are attached at the end of each snap arm to ensure snug and lasting fit. Negative space ensures position of the locking friction clamp 102 remains locked in place, without risk of unintentional release.

Figure 13:
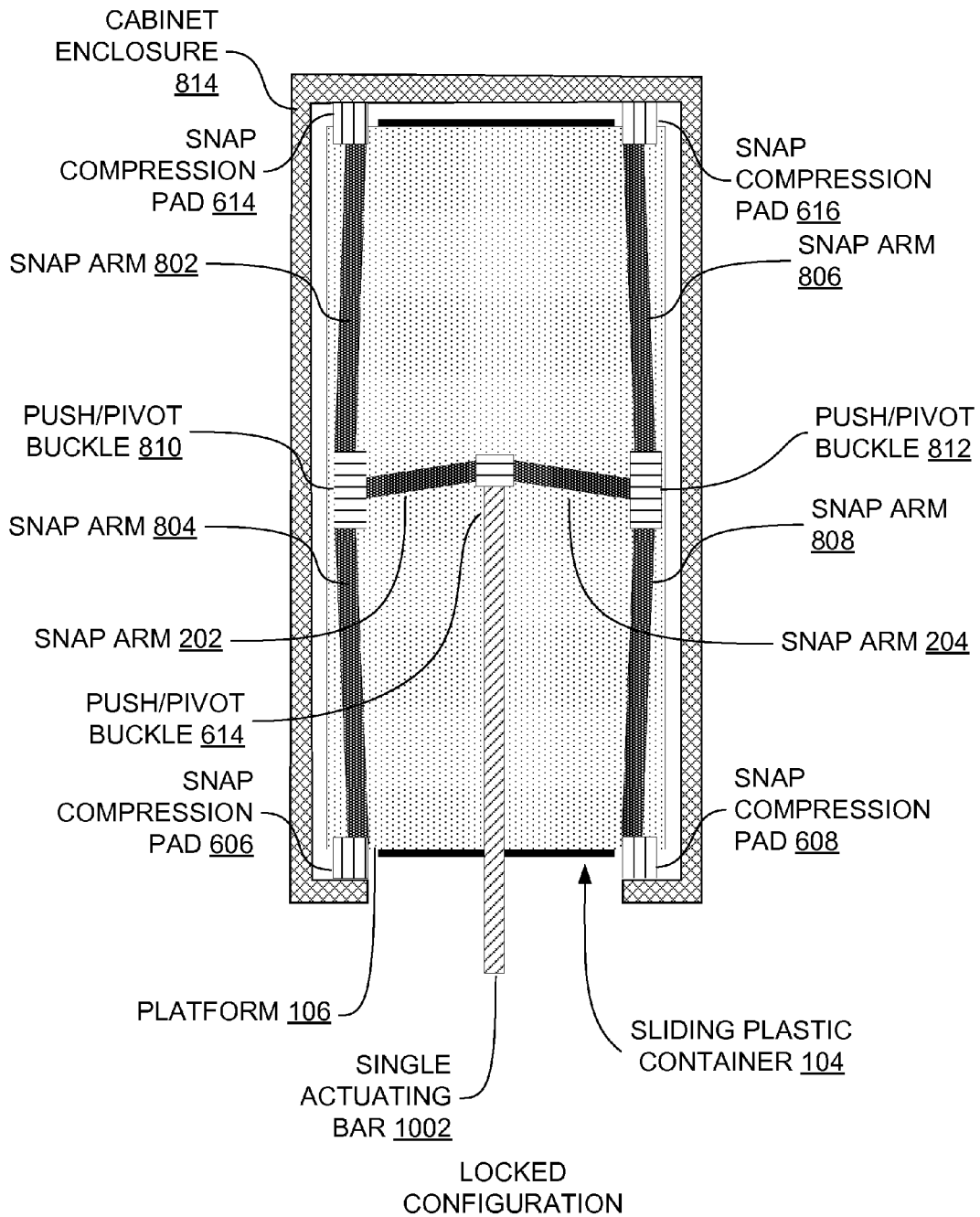
FIG. 13 is a bottom view of a block diagram of a lateral pressure mounted storage apparatus of a pressure mounted storage system in a locked configuration, according to an implementation.

FIG. 13 is a bottom view of a block diagram of a lateral pressure mounted storage apparatus 1200 of a pressure mounted storage system in a locked configuration, according to an implementation. The pressure mounted storage apparatus 1200 is shown in FIG. 13 in a locked configuration.

The locking friction clamp 102 includes snap arms 202 and 204 that are rigid arms. When the snap arms 202 and 204 are pushed outward by a push/pivot buckle 610, the snap arms 202 and 204 apply pressure through snap compression pads 614, 616, 606 and 608 upon and onto snap arms 802, 804, 806 and 808 that are rigid arms. When the snap arms are pushed outward by a push/pivot buckle 810 and 812, the snap arms apply pressure through a snap compression pads 614, 616, 606 and 608 upon and onto the inner walls of the cabinet enclosure 814. Each pair of snap arms (such as pair 802 and 804) are identical in structure and function. The push/pivot buckles 810 and 812 connect the snap arms together and serve as the central connection and rotation point to the snap arms. The snap compression pads 614, 616, 606 and 608 are attached at the end of each snap arm to ensure snug and lasting fit. Negative space ensures position of the locking friction clamp 102 remains locked in place, without risk of unintentional release.

Figure 14:
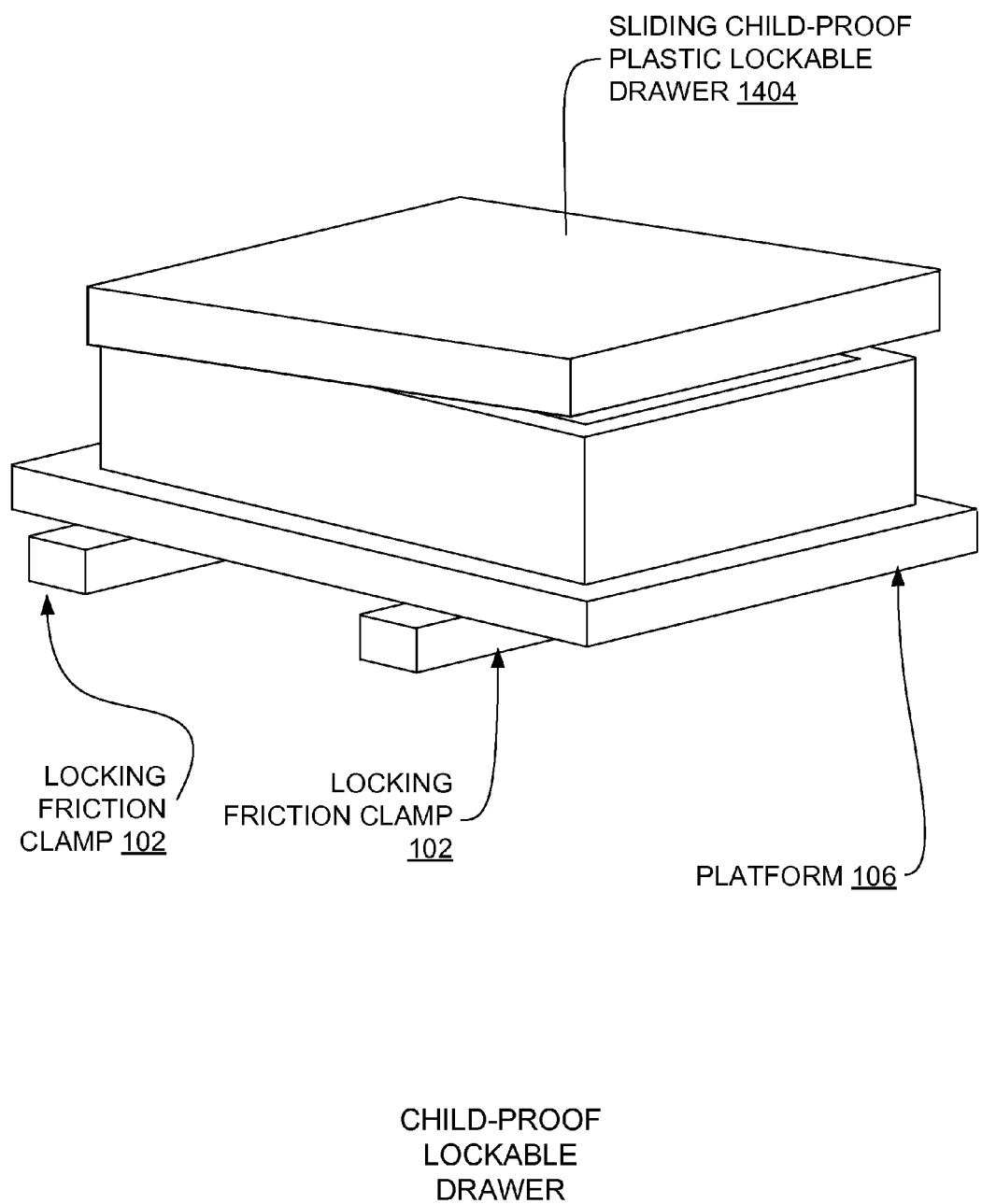
FIG. 14 is an isometric diagram of a pressure mounted child-proof lockable storage apparatus, according to an implementation.

FIG. 14 is an isometric diagram of a pressure mounted child-proof lockable storage apparatus 1400, according to an implementation. The pressure mounted child-proof lockable storage apparatus 1400 includes a sliding child-proof lockable drawer 1402.

Figure 15:
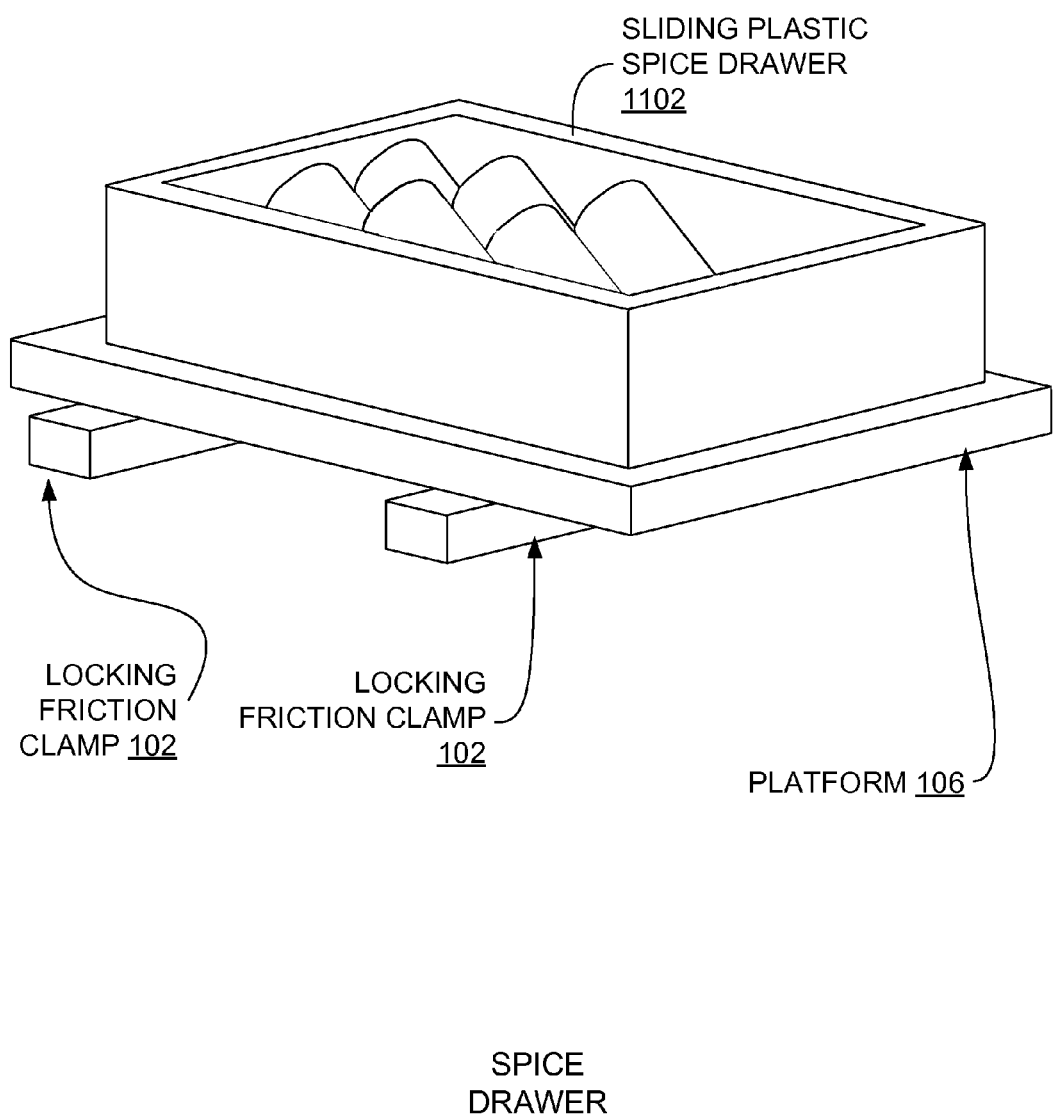
FIG. 15 is an isometric diagram of a pressure mounted spice storage apparatus, according to an implementation.

FIG. 15 is an isometric diagram of a pressure mounted spice storage apparatus 1500, according to an implementation. The pressure mounted spice storage apparatus 1500 includes a sliding plastic spice drawer 1502.

Figure 16:
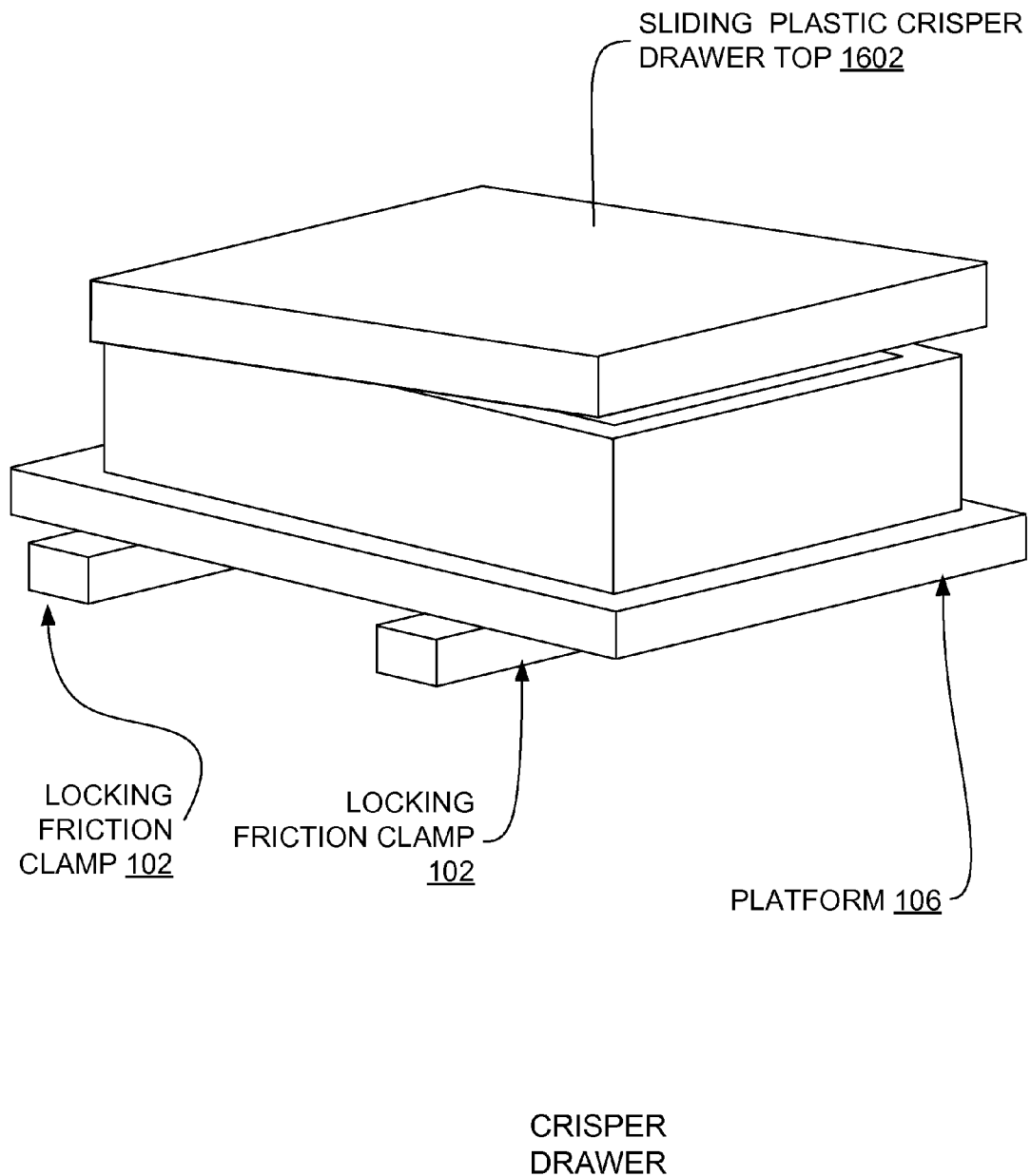
FIG. 16 is an isometric diagram of a pressure mounted crisper storage apparatus, according to an implementation.

FIG. 16 is an isometric diagram of a pressure mounted crisper storage apparatus 1600, according to an implementation. The pressure mounted crisper storage apparatus 1600 includes a crisper drawer with a top 1602.

Figure 17:
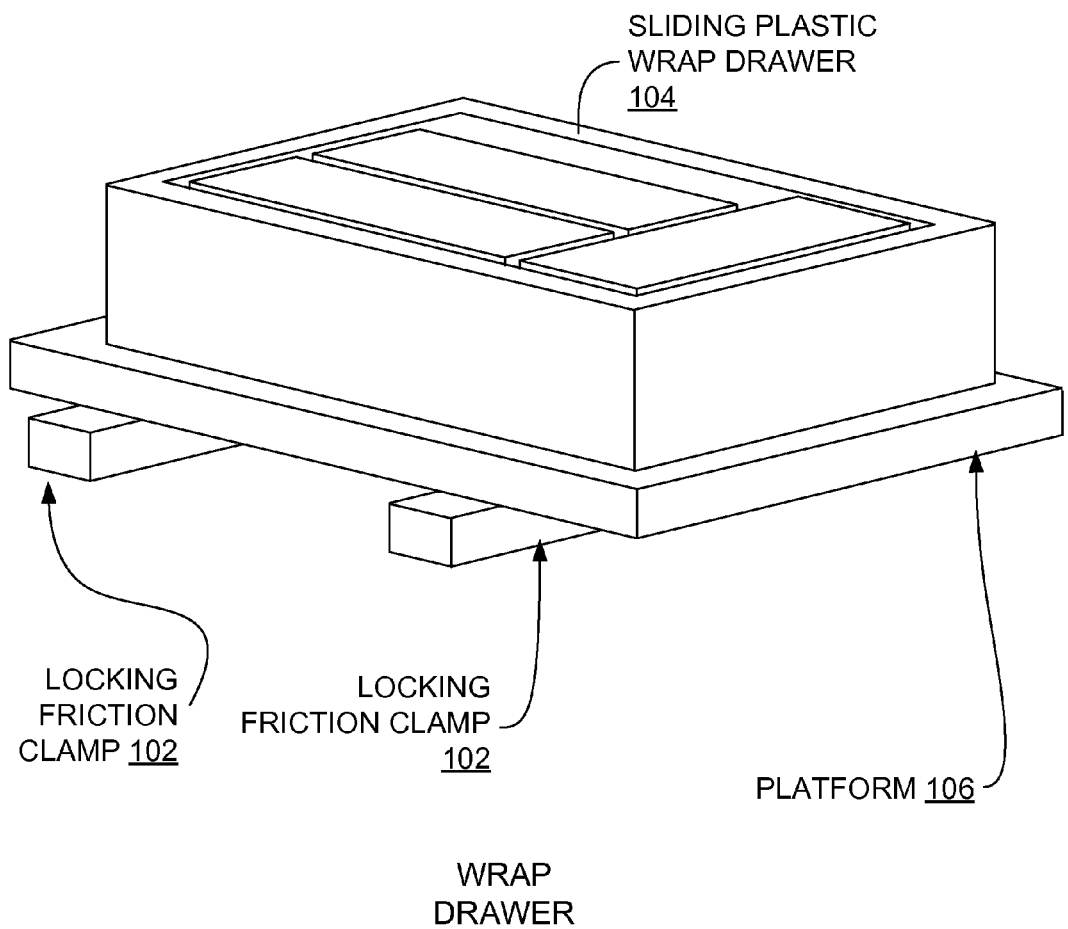
FIG. 17 is an isometric diagram of a pressure mounted wrap storage apparatus, according to an implementation.

FIG. 17 is an isometric diagram of a pressure mounted wrap storage apparatus 1700, according to an implementation. The pressure mounted wrap storage apparatus 1700 includes a drawer that is suitable for storing packages of aluminum foil wrap and plastic wrap. Some implementations of the pressure mounted wrap storage apparatus 1700 include dividers that separate the packages of aluminum foil wrap and plastic wrap.

Figure 18:
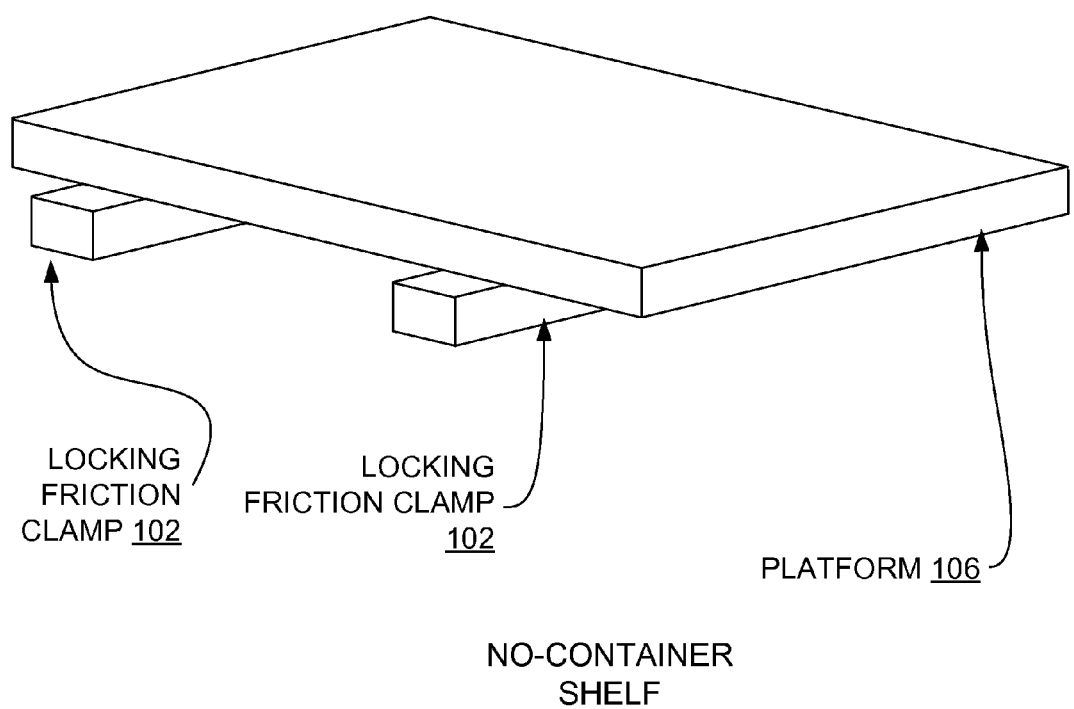
FIG. 18 is an isometric diagram of a pressure mounted platform apparatus with no drawer, according to an implementation.

FIG. 18 is an isometric diagram of a pressure mounted platform apparatus 1800 with no drawer or container, according to an implementation.

Figure 19:
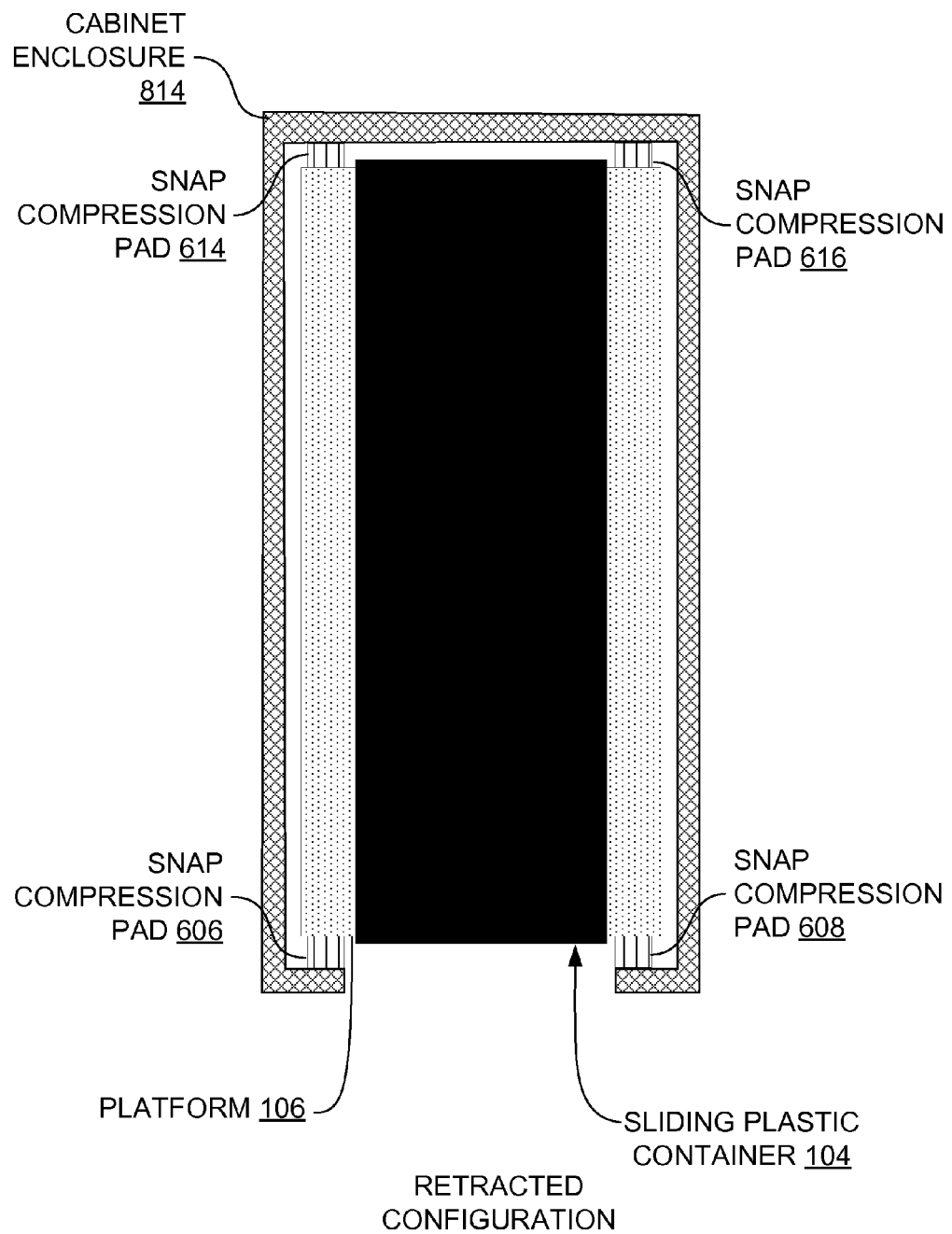
FIG. 19 is a top view of a block diagram of a lateral pressure mounted storage apparatus of a pressure mounted storage system in a closed configuration, according to an implementation.

FIG. 19 is a top view of a block diagram of a lateral pressure mounted storage apparatus 800 of a pressure mounted storage system in a closed configuration, according to an implementation.

The locking friction clamp 102 includes the snap compression pads 614, 616, 606 and 608 that are attached at the end of each snap arm (not shown in FIG. 19) to ensure snug and lasting fit. The sliding plastic container 104 is in a retracted (closed) position.

Figure 20:
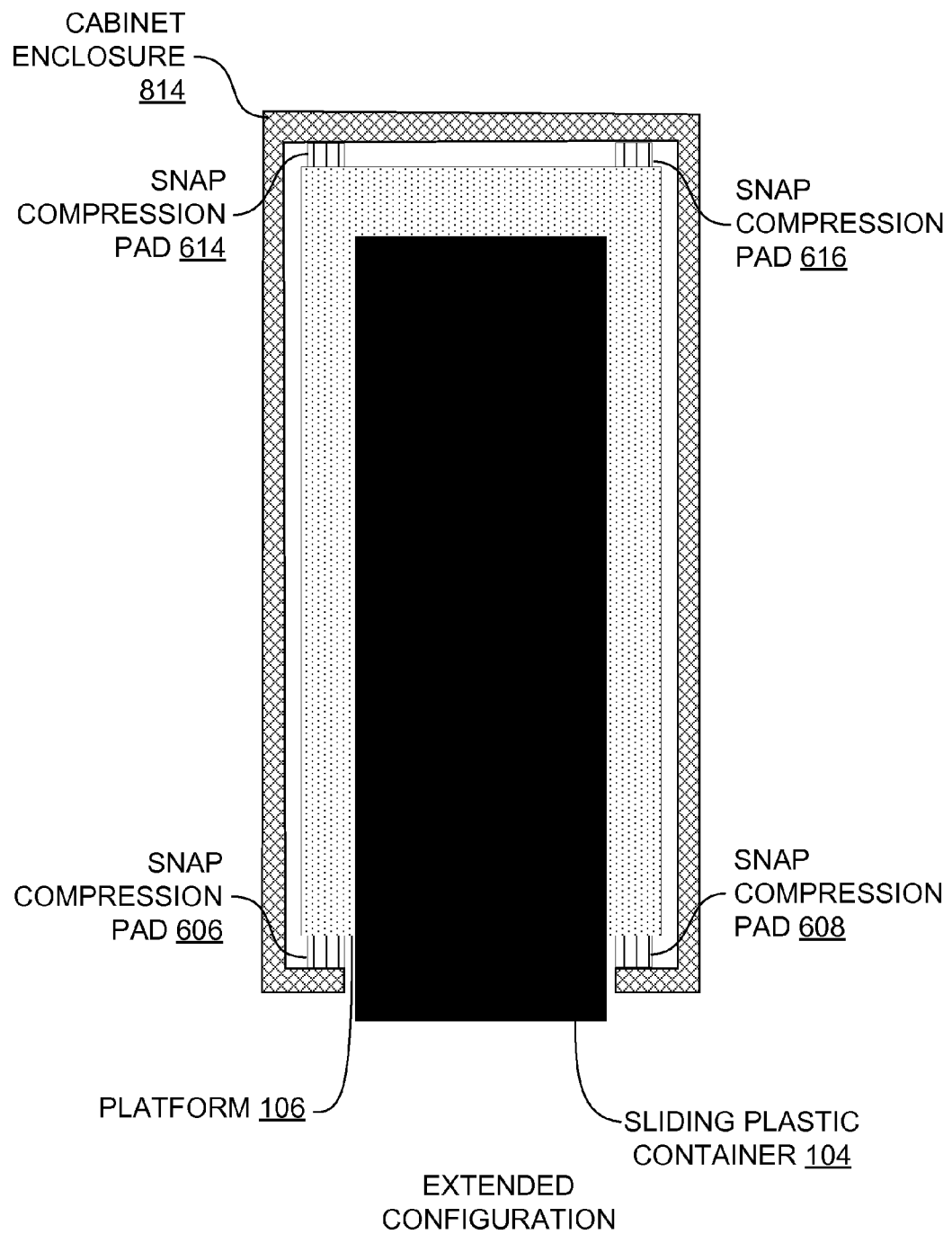
FIG. 20 is a top view of a block diagram of a lateral pressure mounted storage apparatus of a pressure mounted storage system in an open configuration, according to an implementation.

FIG. 20 is a top view of a block diagram of a lateral pressure mounted storage apparatus 800 of a pressure mounted storage system in an open configuration, according to an implementation. The sliding plastic container 104 is in an extended (opened) position.

Method

Figure 21:
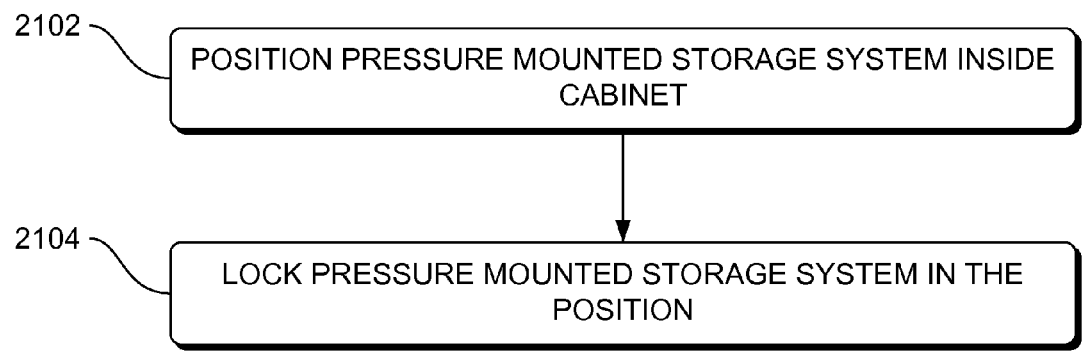
FIG. 21 is a flowchart of a method of installing the pressure mounted storage apparatus, according to an implementation.

FIG. 21 is a flowchart of a method 2100 of installing the pressure mounted storage apparatus, according to an implementation. Method 2100 includes positioning the pressure mounted storage apparatus inside a cabinet at block 2102 and locking the pressure mounted storage apparatus in the position by snapping the snap bars in a locked position.

In particular, one of skill in the art will readily appreciate that the names of the methods and apparatus are not intended to limit implementations. Furthermore, additional methods and apparatus can be added to the components, functions can be rearranged among the components, and new components to correspond to future enhancements and physical devices used in implementations can be introduced without departing from the scope of implementations. One of skill in the art will readily recognize that implementations are applicable to future drawers, different pivots, and new moveable mounts.

CONCLUSION

The terminology used in this application is meant to include all pivot arms and compression pads and alternate technologies which provide the same functionality as described herein.

The invention claimed is:
1. A pressure mounting apparatus comprising:
a planar rectangular platform having a first plane that is parallel to both of the two longest dimensions of the planar platform;
a locking friction clamp having two pairs of snap arms, the two pairs of snap arms including a front pair of snap arms and a back pair of snap arms, the snap arms arranged along a second plane that is parallel the first plane, the snap arms pivotally coupled to the platform, wherein each snap arm has an inner end and an outer end, the inner end is coupled to a buckle, wherein each buckle connects a pair of snap arms together, the outer end of each snap arm has a snap compression pad,
wherein the snap arms have a locked position and an unlocked position and wherein the snap arms hold the platform in position in an enclosure having at least two opposing walls by creating friction against the opposing walls of the enclosure sides of the with the snap compression pads while in the locked position, wherein the snap compression pads are not attached to the opposing walls of the enclosure using an attachment device and in the locked position the snap arms are rotated to a position beyond a straight line alignment to each other; and a single actuating bar that is movable along only the second plane and that applies mechanical pressure along the second plane to each of the snap arms simultaneously, and the mechanical pressure being applied equally between the front pair of snap arms in the back pair of snap arms, wherein the single actuating bar is operably coupled to the snap arms.

2. The pressure mounting apparatus of claim 1, wherein the at least one snap arm further comprises: the at least one step arm operable to expand to a width of walls.

3. The pressure mounting apparatus of claim 2, wherein the at least one snap arm further comprises: the at least one snap arm being operable to expand to a length of the walls.

4. The pressure mounting apparatus of claim 1, further comprising: a level permanently attached to the platform.

5. The pressure mounting apparatus of claim 1, further comprising: a drawer moveably attached to the platform.

6. The pressure mounting apparatus of claim 5, wherein the drawer further comprises: a childproof lockable drawer.

7. The pressure mounting apparatus of claim 5, where in the drawer further comprises: a spice drawer.

8. The pressure mounting apparatus of claim 5, wherein the drawer further comprises: a crisper drawer.

9. The pressure mounting apparatus of claim 5, wherein the pressure mounting apparatus further comprises: no other apparatus attached to the platform.

\* \* \* \* \*